(12) United States Patent
Hyakumoto

(10) Patent No.: US 8,428,951 B2
(45) Date of Patent: Apr. 23, 2013

(54) SPEECH RECOGNITION APPARATUS, NAVIGATION APPARATUS INCLUDING A SPEECH RECOGNITION APPARATUS, AND A CONTROL SCREEN AIDED SPEECH RECOGNITION METHOD

(75) Inventor: Toshiyuki Hyakumoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1485 days.

(21) Appl. No.: 11/482,099

(22) Filed: Jul. 6, 2006

(65) Prior Publication Data

US 2007/0033043 A1 Feb. 8, 2007

(30) Foreign Application Priority Data

Jul. 8, 2005 (JP) .................. 2005-199722

(51) Int. Cl.
*G10L 15/28* (2006.01)
*G10L 15/26* (2006.01)
*G10L 17/00* (2006.01)
*G05D 1/00* (2006.01)

(52) U.S. Cl.
USPC ............. 704/255; 704/235; 704/248; 701/1

(58) Field of Classification Search ............... 704/270, 704/232, 248, 255, 235; 701/1
See application file for complete search history.

(56) References Cited

U.S. PATENT DOCUMENTS

| | | | |
|---|---|---|---|
| 5,191,635 A | 3/1993 | Fujimoto | |
| 6,178,401 B1 * | 1/2001 | Franz et al. | 704/255 |
| 6,243,675 B1 * | 6/2001 | Ito | 704/232 |
| 6,324,509 B1 * | 11/2001 | Bi et al. | 704/248 |
| 6,330,497 B1 * | 12/2001 | Obradovich et al. | 701/1 |
| 6,385,582 B1 * | 5/2002 | Iwata | 704/270 |
| 6,446,039 B1 * | 9/2002 | Miyazawa et al. | 704/255 |
| 6,812,942 B2 * | 11/2004 | Ribak | 345/30 |
| 7,076,425 B2 | 7/2006 | Ono et al. | |
| 7,228,275 B1 * | 6/2007 | Endo et al. | 704/235 |
| 7,542,907 B2 * | 6/2009 | Epstein et al. | 704/275 |

FOREIGN PATENT DOCUMENTS

| | | | |
|---|---|---|---|
| JP | 10-097285 A | | 4/1998 |
| JP | 11-231889 A | | 8/1999 |
| JP | 2001348785 | * | 11/2001 |
| JP | 2002-278588 A | | 9/2002 |

(Continued)

OTHER PUBLICATIONS

Office Action from co-pending Japanese Application No. 2005-199722, dated Sep. 21, 2010 (with translation), 9 pages.

*Primary Examiner* — Talivaldis Ivars Smits
*Assistant Examiner* — Farzad Kazeminezhad
(74) *Attorney, Agent, or Firm* — Brinks Hofer Gilson & Lione

(57) ABSTRACT

A speech recognition apparatus includes a speech recognition dictionary and a speech recognition unit. The speech recognition dictionary includes comparison data used to recognize a voice input. The speech recognition unit is adapted to calculate the score for each comparison data by comparing voice input data generated based on the voice input with each comparison data, recognize the voice input based on the score, and produce the recognition result of the voice input. The speech recognition apparatus further includes data indicating score weights associated with particular comparison data, used to weight the scores calculated for the particular comparison data. After the score is calculated for each comparison data, the score weights are added to the scores of the particular comparison data, and the voice input is recognized based on total scores including the added score weights.

20 Claims, 6 Drawing Sheets

FOREIGN PATENT DOCUMENTS

| JP | 2003-150189 A | 5/2003 |
| JP | 2003-177788 A | 6/2003 |
| JP | 2004252783 | * 8/2004 |
| JP | 2007017731 | * 7/2005 |

* cited by examiner

FIG. 4A

| COMPARISON DATA OF OPERATION COMMANDS | SCORE WEIGHTS |
|---|---|
| SCAN | 5 |
| RANDOM | 3 |
| REPEAT | 3 |

| RECOGNITION CANDIDATES | SCORE |
|---|---|
| FAN | 98 |
| CAN | 96 |
| SCAN | 94 |

+

X2

| COMPARISON DATA OF OPERATION COMMANDS | SCORE WEIGHTS |
|---|---|
| SCAN | 5 |
| RANDOM | 3 |
| REPEAT | 3 |

=

Z2

| RECOGNITION CANDIDATES | NEW SCORE |
|---|---|
| FAN | 98 |
| CAN | 96 |
| SCAN | 94+5 |

FIG. 6A

SPEECH RECOGNITION
DICTIONARY
· NEXT
· NICK
· NECK
· 100 METERS
· TOKYO DISNEYLAND
· SET DESTINATION
  ETC.

FIG. 6B

| RECOGNITION CANDIDATES | SCORE |
|---|---|
| NEXT | 98 |
| NECK | 96 |
| NICK | 94 |

FIG. 6C

| RECOGNITION CANDIDATES | SCORE |
|---|---|
| NECK | 98 |
| NICK | 96 |
| NEXT | 94 |

FIG. 7

| | INPUT SPEECH | | |
|---|---|---|---|
| | ⌈NEXT⌋ | ⌈CD⌋ | ⌈SCAN⌋ |
| WORDS DIFFICULT TO DISTINGUISH | NECK | SEED | CAN |
| | NICK | SHE'D | FAN |

SPEECH RECOGNITION APPARATUS, NAVIGATION APPARATUS INCLUDING A SPEECH RECOGNITION APPARATUS, AND A CONTROL SCREEN AIDED SPEECH RECOGNITION METHOD

BACKGROUND OF THE INVENTION

1. Field of the Invention

The present invention relates to a speech recognition apparatus, a navigation apparatus including a speech recognition apparatus, and a speech recognition method.

2. Description of the Related Art

A navigation apparatus is known which receives position information indicating a current vehicle position from an artificial satellite, and displays the position information indicating the current vehicle position, together with map information, on a display to guide a driver. Some navigation apparatuses contain a speech recognition apparatus for recognizing voice commands issued by a user, to set a destination or the like. Use of the speech recognition apparatus can make it easier for a user to operate the navigation apparatus. However, in order to recognize a large number of different spoken words, the speech recognition apparatus must perform a complicated speech recognition process based on comparison using voice inputs. This process is time consuming and can result in incorrect voice command recognition. One known technique to improve the recognition accuracy of the speech recognition apparatus is to reduce the number of words registered in a speech recognition dictionary, thereby minimizing the number of similar words. A specific example of such a technique is to divide a speech recognition dictionary into a plurality of sub-dictionaries and select a proper sub dictionary. By selecting a sub dictionary the number of similar words used at a time is reduced, and the accuracy of the recognition apparatus is improved.

Japanese Unexamined Patent Application Publication No. 8-320697 discloses a speech recognition apparatus which has a speech recognition dictionary divided into a plurality of sub-dictionaries. This apparatus also has the ability to adaptively select a proper sub dictionary depending on the situation. For example, when this apparatus is implemented in a car navigation system, the speech recognition dictionary is divided in advance into sub-dictionaries according to names of cities or towns, and the proper sub dictionary is selected based on the city/town name corresponding to the vehicle's current position. This speech recognition apparatus improves the recognition accuracy and reduces the recognition time by adaptively switching the sub dictionary depending on the vehicle's current location.

However, the known techniques have several problems. The speech recognition apparatus as disclosed in Japanese Unexamined Patent Application Publication No. 8-320697 improves voice input recognition accuracy for commands, such as setting a destination search condition, by dividing the speech recognition dictionary into sub-dictionaries according to the current vehicle position, such as the city/town name. However, this technique does not have sub-dictionaries created based on words used as operation commands to control the operation of the navigation apparatus. In this type of speech recognition apparatus, a navigation apparatus operation voice command is compared with all words registered in the speech recognition dictionary. FIG. 6 shows a process typically performed by a navigation speech recognition apparatus to recognize a voice input, by comparing it with words registered in a speech recognition dictionary in order to produce a recognition result. As shown in FIG. 6A for example, when a voice command of "next" is input by a user, the speech recognition apparatus performs a recognition process that includes comparing the voice input with words registered in the speech recognition dictionary.

During the recognition process, words whose similarity with the voice input "next" that are higher than a predetermined level are extracted as recognition candidates from the speech recognition dictionary. In the present example, as shown in FIG. 6B, "next," "neck," and "nick" are extracted from the speech recognition dictionary shown in FIG. 6A. The similarity is quantitatively expressed, for example, as a score. The speech recognition apparatus then selects the word with the highest score from the recognition candidates, and provides the selected word as the recognition result. In the example shown in FIG. 6B, the word "next" has a score of "98." Because "98" is the highest score of the recognition candidates, "next" is provided as the recognition result. However, problems arise in noisy environments as noise is input together with the voice command to the speech recognition apparatus, thereby increasing the possibility that an incorrect word will be selected as the recognition result. FIG. 6C shows an example of the speech recognition apparatus providing the wrong recognition result in a noisy environment. In this example the user inputs a voice command of "next," however, due to the noisy environment, the speech recognition apparatus incorrectly evaluates the word "neck" as having the highest score of "98," and provides the word "neck" as the recognition result.

FIG. 7 shows examples of words that are difficult for speech recognition apparatuses commonly used in navigation apparatuses to correctly distinguish. When the speech recognition apparatus compares a voice input with all the words registered in the speech recognition dictionary, if the voice input includes noise there is a possibility that the apparatus may provide the wrong recognition result. For example, for a mail reading screen, when the user issues a voice command of "next," there is a possibility that the apparatus will incorrectly recognize the voice input as "neck" or "nick." In another example, when a voice command of "CD" is input by a user to control the operation of an audio device, there is a possibility that the speech recognition apparatus incorrectly recognizes the voice input as "seed" or "she'd." Similarly, when a voice command of "scan" is input by the user to control the operation of the audio device, there is a possibility that the speech recognition apparatus will incorrectly recognize the voice input as "fan" or "can."

Because the recognition process compares the voice input command to all the words registered in the recognition dictionary, the probability of incorrect voice input recognition tends to increase with the number of words registered in the speech recognition dictionary. Incorrect recognition also tends to increase as the length of the voice input decreases. One possible technique to prevent such incorrect recognition is to use alternative words with longer lengths having the same meaning, instead of short words. However, if the user is not allowed to use the short words they are accustomed to, the apparatus will not be convenient to use and will have no commercial value.

In view of the above, it is an object of the present invention to provide a speech recognition apparatus, a navigation apparatus including a speech recognition apparatus, and a speech recognition method capable of performing high-accuracy, substantially error free recognition of voice inputs.

SUMMARY OF THE INVENTION

In order to achieve the above object, the present invention provides a speech recognition apparatus comprising a speech recognition dictionary including comparison data for use in recognition of a voice input; a speech recognition unit adapted to calculate the matching degree by comparing voice input data that is generated based on the voice input with the comparison data, recognize the voice input based on the matching degree, and produce a recognition result of the voice input. The speech recognition apparatus further includes one or more addition data which are used to add weight to the matching degree, and are associated with one or more particular comparison data.

The matching degree used in this apparatus is calculated for comparison data whose weight can be adjusted by using addition data depending on the situation. Addition data is associated with comparison data for words that are particularly difficult to distinguish correctly from other similar words, and used to weight the matching degree calculated for the comparison data.

In this apparatus, for a given voice input, the speech recognition unit may select one or more comparison data as candidates for the recognition result, based on the matching degree calculated for each comparison data; add the addition data associated with the selected comparison data to the matching degrees calculated for the selected comparison data; and recognize the voice input based on the new weighted matching degrees obtained by adding the addition data. By weighting the matching degrees with addition data for the selected recognition candidates, it is possible for the speech recognition apparatus to correctly recognize the voice input even for short words that are difficult to recognize correctly using the conventional technique. Using this technique, the apparatus of the present invention achieves improved speech recognition.

The speech recognition dictionary of the apparatus may include the addition data. In the present invention, because the addition data are associated with the corresponding comparison data, it is possible to store the addition data in the speech recognition dictionary separately from the comparison data. This makes it possible to manage the addition data separately from the comparison data, and makes it possible to easily prepare addition data separately depending on the category of comparison data. For example, it is possible to prepare addition data separately for comparison data of place names, comparison data of operation commands, etc. It is also possible to store the addition data in another storage device instead of storing it in the speech recognition dictionary.

The comparison data of the speech recognition apparatus may include the addition data. That is, the addition data may be part of the comparison data. In this case, the addition data are directly associated with the corresponding comparison data, thus making it possible to easily determine whether comparison data selected as recognition candidates have associated addition data. By directly associating addition data with the corresponding comparison data, it is possible to easily acquire addition data in the weighting process.

The addition data may be associated with a configurational condition in which a voice input is accepted. This makes it possible to easily acquire proper addition data in the weighting process depending on the configurational condition in which the voice input is accepted. It is also possible to identify comparison data indirectly associated with addition data that is directly associated with the configurational condition in which the voice input is accepted. A specific example of a configurational condition in which the voice input is accepted is a particular operation screen displayed on a display of the navigation apparatus.

In the apparatus, a plurality of different addition data may be associated with each of the one or more particular comparison data. Additionally, the plurality of different addition data may be associated with the respective configurational conditions in which the voice input is accepted. The weights of the addition data associated with the comparison data may be varied according to the configurational condition in which the voice input is accepted. More specifically, for each particular configurational condition, comparison data are associated with addition data, such that the comparison data that are highly likely to be used in a particular configurational condition are associated with addition data having large weights. Conversely, comparison data which are likely not used in that particular configurational condition are associated with addition data having small weights. In this way, it is possible to minimize the probability of incorrect recognition that can otherwise occur without changing the addition data, even when addition data defined for use in a particular situation are used in different situations.

The configurational condition in which the voice input is accepted may be a configurational condition involving an electronic device that is operably connected to the speech recognition apparatus, and whose operation is controlled by voice input. Examples of such electronic devices operably connected to the speech recognition apparatus include, but are not limited to, an audio device and an air conditioner.

In the event that the matching degree of first comparison data calculated for a voice input and the matching degree of second comparison data calculated for the same voice input are so similar that both matching degrees satisfy a predetermined matching condition, if the first comparison data is associated with the configurational condition in which the voice input is accepted, the addition data associated with the first comparison data may be assigned a greater weight than the addition data associated with the second comparison data. In the present invention, when it is difficult to correctly distinguish comparison data from each other, a larger weight is assigned to addition data associated with the configurational condition in which the comparison data is highly likely to be used, thereby increasing the probability that a voice input will be correctly recognized under the configurational condition in which it is made.

The weight of the addition data may vary depending on which addition data the comparison data is associated with. That is, in this speech recognition apparatus, the weights of the addition data associated with comparison data may differ among comparison data.

Addition data may be weighted by the apparatus such that the shorter the voice input to be recognized using the comparison data, the greater the weight of addition data is assigned. For example, a larger weight is assigned to comparison data corresponding to a short word that is difficult to recognize correctly when it is input in a noisy environment.

Comparison data used to recognize a voice input of an operation command may be assigned to addition data. That is, by associating proper addition data to comparison data used to recognize voice inputs of operation commands (hereinafter, such comparison data will be referred to simply as an "operation command comparison data"), it is possible to increase the accuracy of the speech recognition apparatus for voice inputs of operation commands. Thus, in this speech recognition apparatus, even if the speech recognition dictionary does not include a sub dictionary for use in recognizing operation commands, it is still possible to recognize operation commands with high recognition accuracy.

In the apparatus, comparison data not used to recognize the voice input of the operation command may be removed as recognition candidates from the comparison data selected by the speech recognition unit based on the matching degree.

The apparatus is able to distinguish operation command comparison data from other comparison data by determining whether addition data associated with comparison data exists. When the speech recognition apparatus is used in a situation where the voice input is highly likely to be an operation command, comparison data other than operation command comparison data are discarded from recognition candidates, thereby improving the recognition accuracy of the speech recognition apparatus.

The present invention also provides a navigation apparatus including a controller adapted to display an operation control screen on a display, as well as the speech recognition apparatus described above, wherein the configurational condition in which the voice input is accepted is the operation control screen displayed by the controller. In this navigation apparatus, it is easy to acquire the correct addition data necessary to calculate the matching degree for comparison data of recognition candidates.

In the navigation apparatus, comparison data other than the particular comparison data associated with the addition data corresponding to the operation control screen being currently displayed may be removed from the comparison data selected by the speech recognition unit as recognition candidates for the voice input. In this navigation apparatus, it is possible to distinguish comparison data indirectly associated with the operation screen being currently displayed from other comparison data, by determining whether there is associated addition data and if so, using the addition data directly associated with the operation screen being currently displayed. In this way, it is possible to discard comparison data having no relation with the operation screen being currently displayed from recognition candidates and improve the recognition accuracy of the speech recognition apparatus.

The present invention also provides a navigation apparatus to which an electronic device is operably connected. The navigation apparatus includes the speech recognition apparatus as described above, wherein the configurational condition for operating the electronic device is controlled by voice input through an operation mode selected for the electronic device. In this navigation apparatus using the operation mode of the electronic device, it is easy to acquire correct addition data used to weight the matching degree calculated for comparison data of recognition candidates.

When the electronic device is being used in a particular operation mode, comparison data other than the particular comparison data corresponding to the addition data associated with the electronic device's current operation mode may be removed from the recognition candidates for the voice input. Thus, this navigation apparatus can further improve recognition accuracy by discarding comparison data having no relation to the current operation mode from the recognition candidates.

The present invention also provides a speech recognition method comprising the steps of calculating the matching degree for each comparison data used to recognize a voice input; adding addition data to the calculated matching degree for one or more particular comparison data associated with addition data used to weight the matching degree; and recognizing the voice input based on the new matching degrees obtained by adding the addition data.

As described above, the present invention provides a speech recognition apparatus, a navigation apparatus including the speech recognition apparatus, and a speech recognition method capable of performing recognition of voice inputs with very high accuracy.

BRIEF DESCRIPTION OF THE DRAWINGS

FIG. 4 is a diagram showing a process performed by a speech recognition apparatus to recognize a voice input according to an embodiment of the invention;

FIG. 6 is a diagram showing a process performed by a speech recognition apparatus of a type commonly used in a navigation apparatus, the process including comparing a voice input with words registered in a speech recognition dictionary and providing a recognition result; and FIG. 7 is a table showing examples of words that are difficult to correctly recognize in a speech recognition process performed by a speech recognition apparatus of a type commonly used in a navigation apparatus.

DESCRIPTION OF THE PREFERRED EMBODIMENTS

Figure 1:
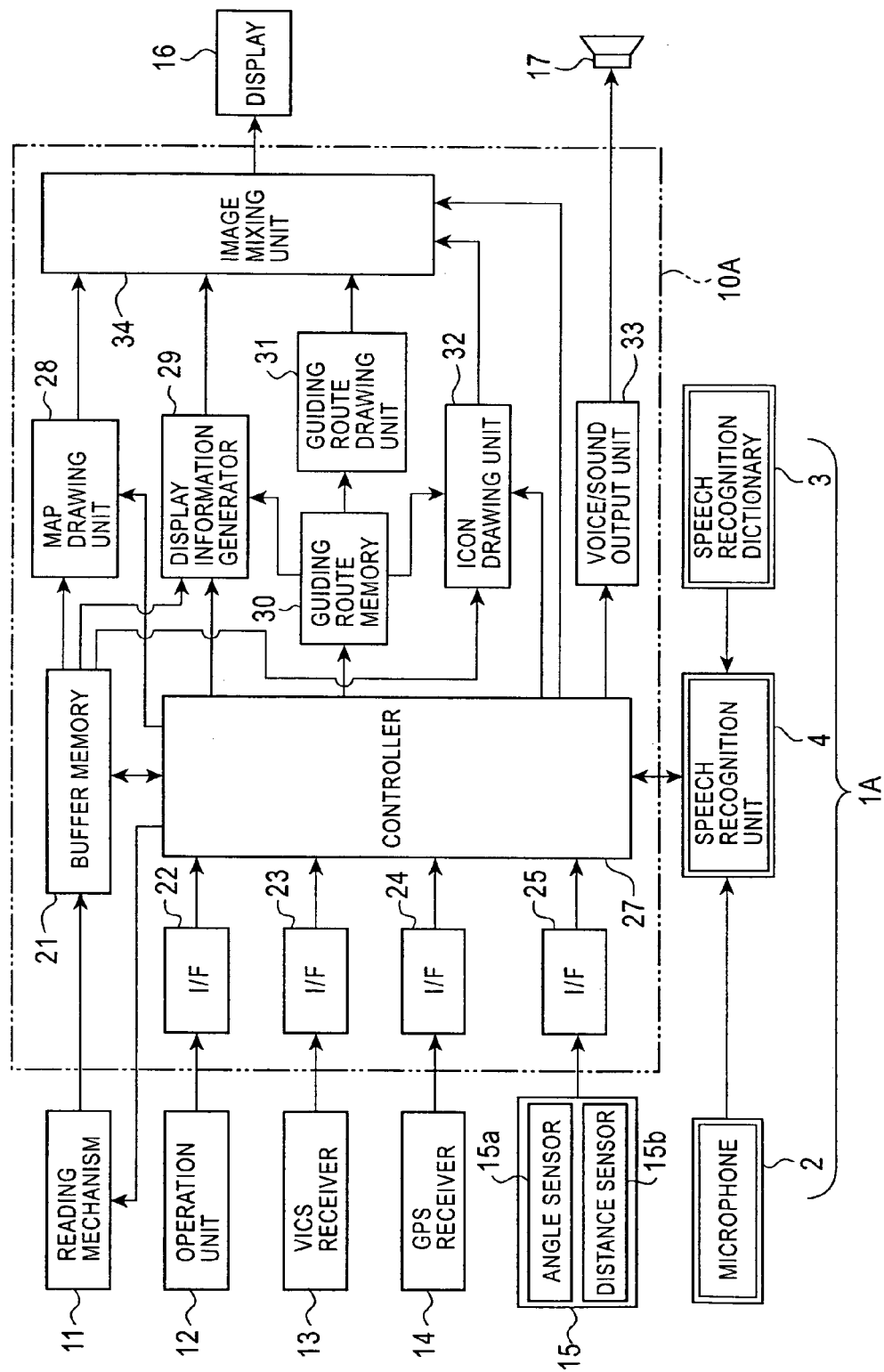
FIG. 1 is a diagram showing a navigation apparatus including a speech recognition apparatus according to an embodiment of the present invention.

A speech recognition apparatus 1A and a navigation apparatus 10A, configured to include the speech recognition apparatus 1A according to an embodiment of the invention, are described in detail below with reference to FIG. 1. In FIG. 1, a reading mechanism 11 is adapted to read a storage medium (map database) such as a CD (Compact Disk)-ROM (Read Only Memory) or a DVD (Digital Versatile Disc)-ROM on which map data and other guidance data are stored. Other storage devices such as a hard disk drive may also be used for this purpose.

An operation unit 12 is used by a user to input various operation/setup commands to the navigation apparatus 10A. The operation unit 12 may be in a separate form, such as a remote controller or a control panel, or may be in a form integrated with a display 16 described later, such as a touch-panel input device integrally formed on the display 16. A microphone for inputting a voice may also be used as the operation unit 12.

A VICS (Vehicle Information Communication System) receiver 13 is adapted to receive VICS information transmitted from a radio beacon or a light beacon. A GPS (Global Positioning System) receiver 14 is adapted to receive a GPS signal transmitted from a GPS Satellite and detect the latitude and the longitude of the current position of the vehicle. An autonomous navigation sensor 15 includes an angle sensor 15a including a gyroscope for detecting the vehicle direction and a distance sensor 15b that generates a pulse in set intervals based on a predetermined traveling distance. The autonomous navigation sensor 15 is configured to detect the direction and the speed of the vehicle.

A display 16 is a unit for displaying various kinds of information such as a map, a guidance route, the current vehicle position, buildings, icons, and input from the navigation apparatus 10A. For example, a liquid crystal display may be employed for the display 16. A speaker 17 is a unit for producing voice guidance information received from the navigation apparatus 10A. The speaker 17 can also produce, e.g., music, from an audio device or the like.

In the navigation apparatus 10A, a buffer memory 21 is adapted to temporarily store map data input from the reading mechanism 11 under the control of a controller 27, which will be described later. The operation unit 12, the VICS receiver 13, the GPS receiver 14, and the autonomous navigation sensor 15, are connected to an internal bus of the in-vehicle navigation apparatus 10A via interfaces (I/F) 22, 23, 24 and 25 respectively.

The controller 27 includes a processor such as a microcomputer or a CPU (Central Processing Unit). The controller 27 has a program for navigation. In accordance with this program, the controller 27 performs various navigation processes including: detecting the current vehicle position based on signals output from the GPS receiver 14 and the autonomous navigation sensor 15, reading data of a map or the like to be displayed from the reading mechanism 11 into the buffer memory 21, searching for a guiding route from the map data read in the buffer memory 21, and searching for one or more guiding routes that satisfy a given search condition by using the map data in the buffer memory 21. The program described above may be stored on a CD-ROM, a DVD-ROM, or the like. In this case, the controller 27 reads the program from the CD-ROM or the DVD-ROM as required and executes the program.

A map drawing unit 28 is a unit adapted to draw a map image using map data read into the buffer memory 21. A display information generator 29 is a unit adapted to generate various menu screens (operation screen 18) and various marks such as a cursor, depending on the operation status. A guiding route memory 30 is a unit adapted to store data associated with all nodes of a guiding route retrieved by the controller 27 based on search conditions, including a starting point and a destination. A guiding route drawing unit 31 is a unit adapted to read guiding route data from the guiding route memory 30 and draw a guiding route, such that it is displayed differently from the other roads (for example, the guiding route is highlighted in color and/or width). An icon drawing unit 32 is a unit adapted to draw icons such as buildings, spots, the user's vehicle, the other vehicles, etc. on the map image. An audio output unit 33 includes a DSP (Digital Signal Processor) and is adapted to output an audio signal to the speaker 17 in accordance with the signal supplied from the controller 27.

An image mixing unit 34 is a unit adapted to mix the map image drawn by the map drawing unit 28 with the guiding route drawn by the guiding route drawing unit 31, the operation control screen 18, various marks drawn by the display information generator 29, various icons drawn by the icon drawing unit 32, and images supplied from the controller 27, so that the resultant combined image is displayed on the display 16.

The structure of the speech recognition apparatus 1A according to the present embodiment is described in further detail below with reference to FIG. 1. A microphone 2 is adapted to convert a voice input by a user into an electrical signal. If the operation unit 12 of the navigation apparatus 10A includes a microphone for receiving a voice input, voices may be input through this microphone without using the microphone 2. Comparison data used to compare and recognize a voice input is registered in a speech recognition dictionary 3, and is implemented on a storage medium such as a CD-ROM or a DVD-ROM. Instead of the CD-ROM or the DVD-ROM, a storage device such as a hard disk drive may be used. In the event the map database associated with map data is implemented on a storage device, the storage device may also be used to implement the speech recognition dictionary 3 by using a part of the storage capacity of the storage device.

The speech recognition dictionary 3 includes addition data (hereinafter referred to as a score weight) associated with comparison data. The score weight is a score point added to a matching score (hereinafter also referred to simply as a score) indicating the similarity between particular comparison data and a voice input. Alternatively, the comparison data itself may include data indicating score weights. Note that the score weights may be stored in a storage device separately from the speech recognition dictionary 3.

In the present embodiment, score weights are associated with comparison data corresponding to particular voice operation commands to be recognized (hereinafter, such comparison data will be referred to simply as operation command comparison data). Herein, operation commands refer to commands which are input by a user to control the operation of the navigation apparatus 10A, or an electronic device connected to the navigation apparatus 10A.

A speech recognition unit 4 is a unit adapted to recognize the voice input by converting the voice input from the form of an electrical signal to speech data in the form of a digital signal, and compare the resultant digital voice input data with comparison data. Alternatively, the microphone 2 may convert the voice input data into the form of a digital signal, or an A/D converter may be disposed between the microphone 2 and the speech recognition dictionary 3 to convert the voice input data into the form of a digital signal.

Figure 2:
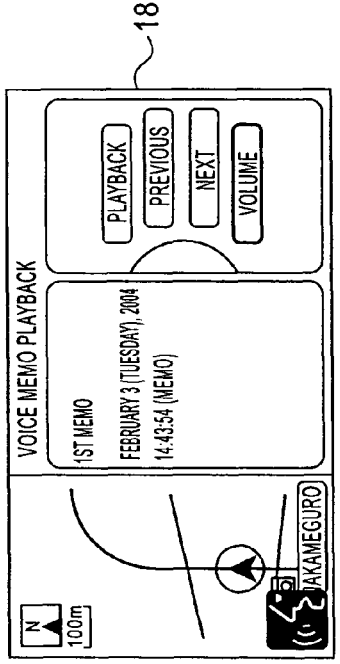
FIG. 2 is a diagram showing a process performed by a speech recognition apparatus to recognize a voice input according to an embodiment of the invention.

The process performed by the speech recognition apparatus 1A to recognize the voice input is described in detail below with reference to FIG. 2. FIG. 2A shows the operation control screen 18 displayed on the display 16 by the controller 27 when the navigation apparatus 10A provides a voice memo to a user. FIG. 2B shows a table X1 representing comparison data of operation commands displayed on the operation control screen 18, and also representing score weights associated with the operation control screen 18. FIG. 2C schematically shows the process performed by the speech recognition unit 4 to recognize a voice input in a state where the navigation apparatus 10A provides a voice memo to a user.

More specifically, score weights included in the table X1 shown in FIG. 2B are associated with the screen ID assigned to the operation control screen 18. That is, in a state where the operation control screen 18 is displayed, the score weights associated with the comparison data of operation commands that are displayed on the operation control screen 18 and likely to be used when the operation control screen 18 is displayed, can be easily acquired based on the screen ID. The values of the respective score weights shown in the table X1 are set such that a higher score weight is assigned to a shorter word to be recognized by the apparatus. More specifically, in this example a score weight as high as "5" is assigned to the words "next" and "previous," while a score weight of "3" is assigned to the words "playback" and "stop."

If a voice command "next" issued by a user is input via the microphone 2 in the state in which the operation control screen 18 is displayed, the speech recognition unit 4 calculates the score by comparing comparison data in the speech recognition dictionary 3 with the voice input "next," and selects comparison data having scores equal to or higher than a predetermined threshold value as recognition candidates. In the present embodiment, by way of example, the threshold value is set to "90," although there is no particular restriction on the threshold value. In FIG. 2C, table Y1 shows comparison data selected by the speech recognition unit 4 as recognition candidates for "next." In the example shown in FIG.

2C, the speech recognition unit 4 selects three words "neck," "nick," and "next" as recognition candidates for the voice input "next," wherein the score for "neck" is calculated as "98," "nick" as "96," and "next" as "94." In this specific example, the score given to "next" is lower than the scores given to the other recognition candidates. Such underestimation can occur, for example, when the voice is input in a noisy environment. In this case the voice is input to the microphone 2 together with noise, which can cause the voice input to be incorrectly recognized as another word. Such underestimation can often occur when the voice input is short, as is the case with "next."

As shown in FIG. 2C, the speech recognition unit 4 then examines the tables X1 and Y1. The speech recognition unit 4 adds a score weight only to the word "next" because, of the recognition candidates "neck", "nick", and "next" in table Y1, only "next" is associated with a score weight in table X1. As a result, the scores for the respective comparison data selected by the speech recognition unit 4 as recognition candidates are converted to new scores as shown in table Z1. Thus, "next" has a new score of "99." The speech recognition unit 4 then recognizes the voice input as the comparison data with the highest new score of the scores of the comparison data shown in table Z1. If the recognition is performed using the unweighted scores shown in table Y1 instead of the weighted scores shown in table Z1, the speech recognition unit 4 will incorrectly recognize the voice input "next" as "neck," because "neck" has the highest unweighted score. In contrast, in the technique according to the present embodiment, the speech recognition unit 4 correctly recognizes the voice input "next" as "next," because the speech recognition unit 4 performs the recognition based on the new scores that include the additional score weight, as shown in table Z1. The speech recognition unit 4 provides the recognition result to the controller 27, which in turn executes the operation command in accordance with the recognition result.

In a situation where the operation control screen 18 is not displayed, if a score weight of "5" is simply added to the comparison data of "next," there is a possibility that the result is an overestimation. Thus, a voice input other than "next" is incorrectly recognized as "next." The present invention prevents overestimation from occurring, because the different score weights assigned to "next" are dependent upon the situation in which the voice is input.

Second Embodiment

Figure 3:
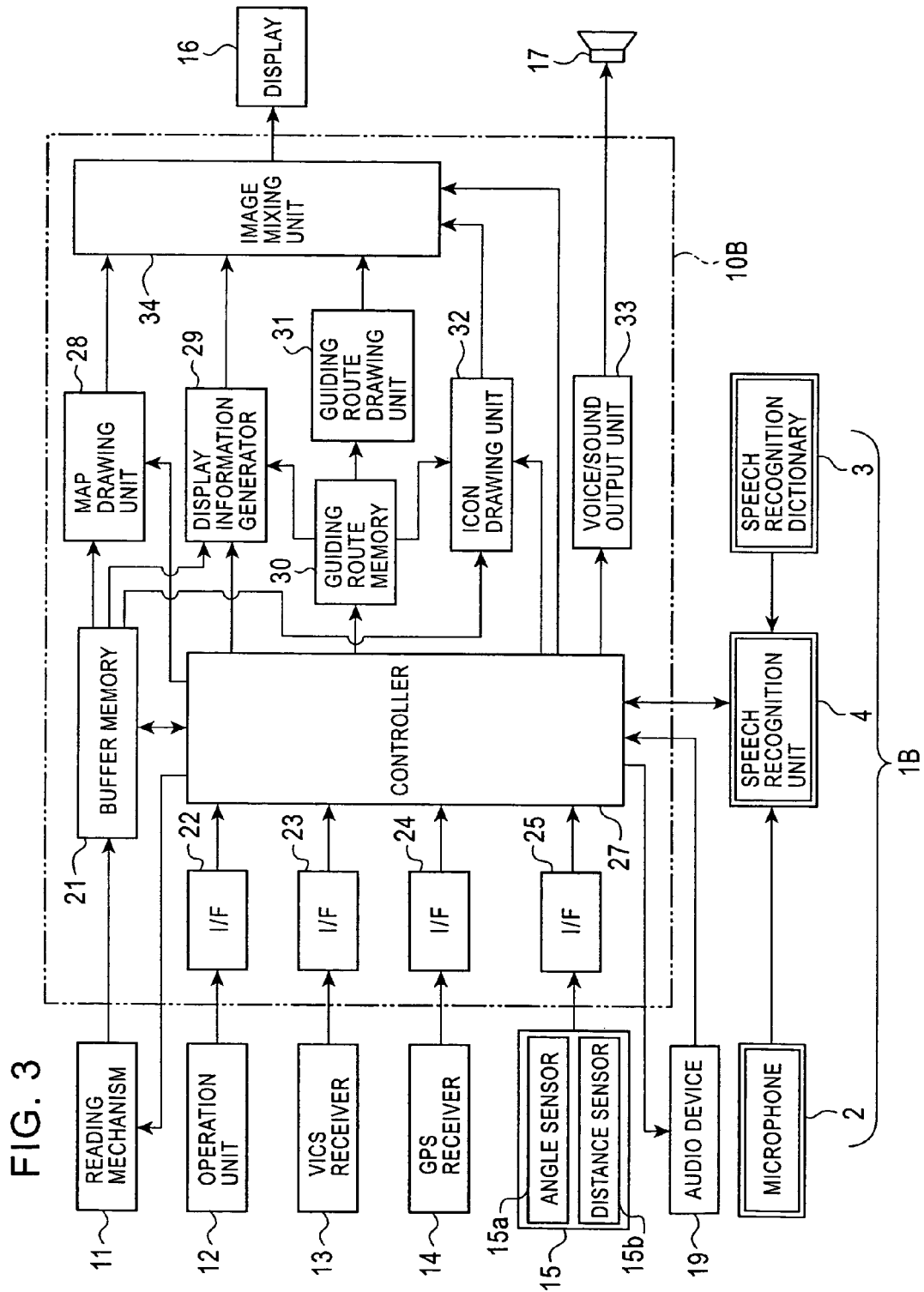
FIG. 3 is a diagram showing a navigation apparatus including a speech recognition apparatus according to another embodiment of the present invention.

In a second embodiment described below, a speech recognition apparatus 1B and a navigation apparatus 10B are similar in structure to the speech recognition apparatus 1A and the navigation apparatus 10A, according to the first embodiment described above. In this second embodiment, as shown in FIG. 3, an audio device 19 capable of playing back a recording medium, such as a CD, is connected as an electronic device to the navigation apparatus 10B so that the operation of the audio device 19 can be controlled with a command issued via the operation unit 12, or with a voice command.

The process performed by the speech recognition apparatus 1B to recognize a voice input is described in detail below and shown in FIG. 4. FIG. 4A shows a table X2 representing comparison data of operation commands for controlling the operation of the audio device 19, and also representing score weights associated with the audio resource (operation mode) such as a CD, FM broadcast, or AM broadcast. FIG. 4B schematically shows the process performed by the speech recognition unit 4 to recognize a voice which is input in a state where the audio device 19 is being used.

More specifically, score weights included in table X2 are associated with the screen ID assigned to the audio resource. For example, in a state where a "CD" is selected by a user via the operation unit 12 and is being used as the audio resource for the audio device 19, the score weights associated with the comparison data of operation commands for playback of the "CD" can be easily acquired using the screen ID. The values of the respective score weights shown in table X2 are set such that a higher score weight is assigned to a word which is difficult to correctly distinguish from other very similar words. More specifically, a score weight as high as "5" is assigned to "scan" because there are other comparison data which are very similar to "scan," while a score weight of "3" is assigned to the words "random" and "repeat."

If a user speaks a voice input of "scan" via the microphone 2 in the state where the "CD" is being used as the audio resource, the speech recognition unit 4 calculates the score by comparing comparison data in the speech recognition dictionary 3 with the voice input "scan" and selects comparison data having scores equal to or higher than a predetermined threshold value as recognition candidates. In the present embodiment, as in the first embodiment described above, the threshold value is set to "90," although there is no particular restriction on the threshold value. In FIG. 4B, table Y2 shows comparison data selected by the speech recognition unit 4 as recognition candidates for the voice input. In the example shown in FIG. 4B, the speech recognition unit 4 selects three words "fan," "can," and "scan" as recognition candidates for the voice input "scan," wherein the score for "fan" is calculated as "98," "can" as "96," and "scan" as "94." In this specific example, the score given to "scan" is lower than the scores given to "fan" and "can." Such underestimation can occur, for example, when the voice is input in a noisy environment. In this case the voice is input together with noise, which can cause the voice input to be incorrectly recognized as another word. Such underestimation can often occur when the voice input is short, as is the case with "scan."

As shown in FIG. 4B, the speech recognition unit 4 examines tables X2 and Y2. The speech recognition unit 4 then adds a score weight only to the word "scan," because, of those words "fan," "can," and "scan" selected as recognition candidates shown in table Y2, only "scan" has a score weight associated thereto in table X2. As a result, the scores for the respective comparison data selected by the speech recognition unit 4 as recognition candidates are converted to new scores as shown in table Z2. Thus, "scan" has a new score of "99." The speech recognition unit 4 then recognizes the voice input as the comparison data with the highest new score of the comparison data scores shown in table Z2. If the recognition is performed using the unweighted scores shown in table Y2 instead of the weighted scores shown in the table Z2, the speech recognition unit 4 will incorrectly recognize the voice input "scan" as "fan," because "fan" has the highest unweighted score. In contrast, in the technique according to the present embodiment, the speech recognition unit 4 correctly recognizes the voice input "scan" as the command "scan," because the speech recognition unit 4 performs the recognition based on the new scores that include the additional score weight shown in the table Z2. The speech recognition unit 4 provides the recognition result to the controller 27, which in turn controls the audio device 19 in accordance with the recognition result.

Figure 5:
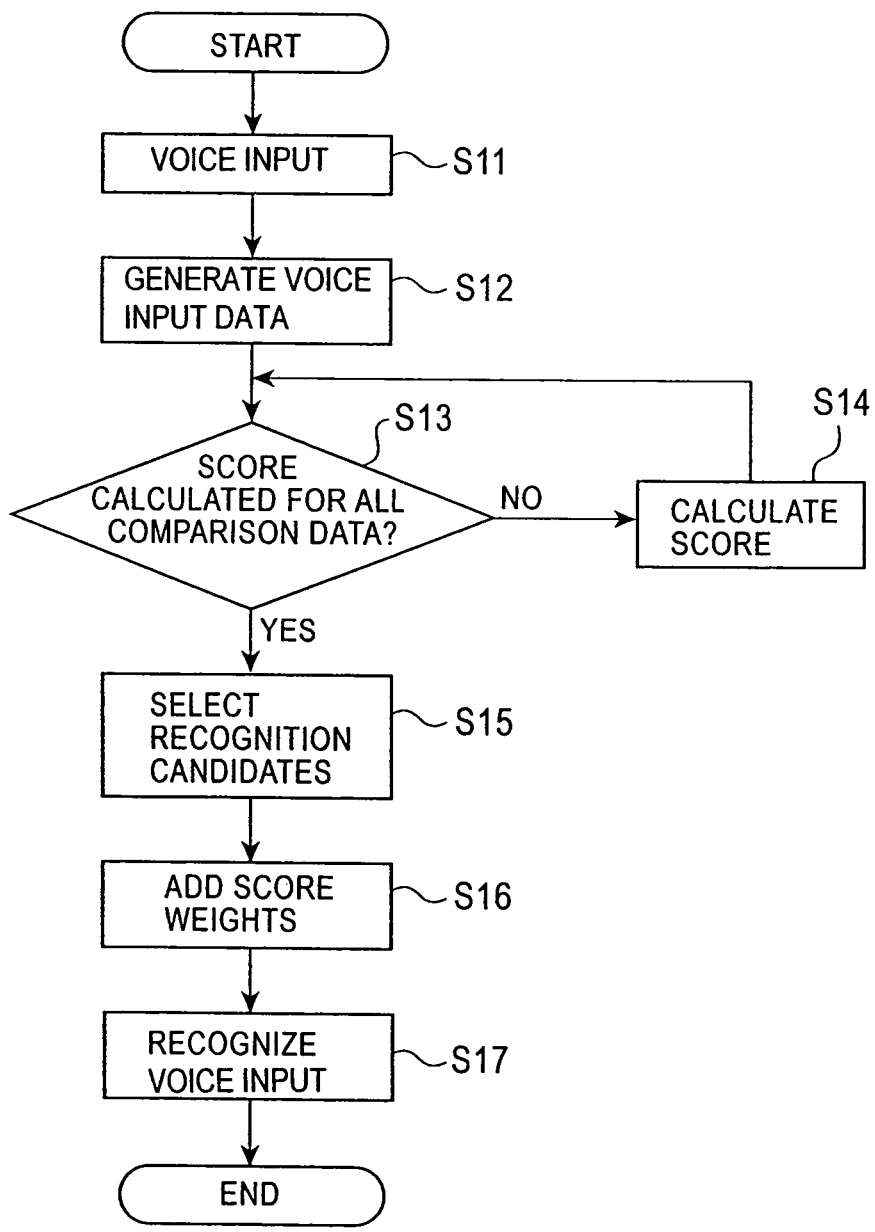
FIG. 5 is a flow chart showing an example of a control process performed by a speech recognition unit to recognize a voice input.

FIG. 5 depicts an example of a control process performed by the speech recognition unit 4 to recognize a voice input and is described in detail below. As shown in FIG. 5, first, a user speaks a voice input into the microphone 2 (step 11). The speech recognition unit 4 converts the voice input into voice input data (step 12). The speech recognition unit 4 then determines whether the scores have been calculated for all the comparison data stored in the speech recognition dictionary 3 (step 13). If the score calculation has not been completed for all comparison data, the speech recognition unit 4 reads the next comparison data from the speech recognition dictionary 3 and calculates its score by comparing it with the voice input data (step 14). If the score calculations have been completed for all comparison data, the speech recognition unit 4 selects comparison data having scores equal to or higher than a predetermined threshold value as recognition candidates (step 15). If a score weight associated with the comparison data exists, the speech recognition unit 4 then adds a score weight to the comparison data selected as a recognition candidate (step 16). After the score weight addition process has been completed, the speech recognition unit 4 recognizes the voice input as the comparison data with the highest new score (step 17).

In an alternative embodiment, the speech recognition unit 4 may recognize a voice input based on comparison data selected as recognition candidates by performing the following process. First, the speech recognition unit 4 checks table X to determine whether a score weight is associated with the comparison data selected as recognition candidates shown in table Y. The speech recognition unit 4 then removes comparison data which is not associated with any score weight from table Y.

In the specific example shown in FIG. 2C, the speech recognition unit 4 checks table X1 and removes the words "neck" and "nick" from table Y1 because they are not associated with any score weight. In the example shown in Fig. 4B, based on table X2, "fan" and "can" are removed from table Y2. That is, in the state in which voice operation commands are input (as in the state where the operation control screen 18 is displayed, or as in the operation mode where a "CD" is used), allowable operation commands are limited to those shown in table X. Thus, using table X it is possible to narrow the comparison data in table Y selected as recognition candidates. Because this embodiment of the present invention removes recognition candidates that are not associated with score weights from table X, it reduces the probability that the speech recognition unit 4 will select incorrect comparison data with a score higher than the correct comparison data that includes the additional score weight, as the final recognition result. Even when two or more comparison data described in table Y and included in table X are selected as recognition candidates, the speech recognition unit 4 can correctly recognize the voice input by adding score weights associated with the comparison data to the respective comparison data. In this way, this embodiment further improves the recognition accuracy of the speech recognition apparatus 1.

Note that the electronic device is not limited to the audio device 19, but the present invention may also be applied to other electronic devices operably connected to the speech recognition apparatus 1, such as an air conditioner. The comparison data to which score weights are assigned are not limited to the comparison data of operation commands. Rather, score weights may be assigned to the comparison data of other words to be recognized, such as place names. Thus, the present invention improves recognition accuracy and minimizes the probability of incorrect recognition for the speech recognition apparatus 1 and the navigation apparatus 10(A&B) using the speech recognition apparatus 1.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A speech recognition apparatus comprising:
a control unit having a controller operably connected to one or more electronic devices, the controller being configured to display an operation control screen on a display for controlling the one or more electronic devices, wherein, when the speech recognition apparatus is in a voice input configurational condition, the one or more electronic devices are controlled by the controller through a plurality of voice inputs;
a speech recognition dictionary including a plurality of comparison data for use in recognition of a voice input of the plurality of voice inputs;
a speech recognition unit adapted to calculate a matching degree for a plurality of speech recognition candidates by comparing voice input data generated based on the voice input with the plurality of comparison data;
and one or more addition data which are associated with one or more particular comparison data within the plurality of comparison data, wherein the one or more addition data is added to the matching degree of the particular comparison data thereby weighting the matching degree, and wherein the speech recognition unit produces the recognition result of the voice input based on the weighted matching degree for the particular comparison data,
wherein, when an operation control screen already configured to a particular electronic device is displayed prior to the voice input, comparison data other than the particular comparison data corresponding to the addition data associated with the operation control screen for the electronic device are removed from the comparison data selected by the speech recognition unit as recognition candidates.

2. The apparatus according to claim 1, wherein the speech recognition unit selects one or more comparison data as candidates for the recognition result for the voice input based on the matching degree calculated for each comparison data; adds the addition data associated with the one or more particular comparison data to the respective matching degrees calculated for the particular one or more comparison data; and recognizes the voice input based on weighted matching degrees obtained as a result of the addition of the addition data.

3. The apparatus according to claim 1, wherein the speech recognition dictionary includes the addition data.

4. The apparatus according to claim 1, wherein a plurality of addition data are associated with each of the one or more particular comparison data.

5. The apparatus of claim 1, wherein the control unit comprises a navigation apparatus.

6. The apparatus according to claim 1, wherein when the matching degree of first comparison data calculated for a voice input and the matching degree of second comparison data calculated for the same voice input both satisfy a predetermined matching condition, if the first comparison data is associated with the operational control screen in which the voice input is accepted, the addition data associated with the first comparison data is assigned a greater weight than the addition data associated with the second comparison data.

7. The apparatus according to claim 1, wherein the weight of the addition data varies depending on the comparison data to which the addition data is associated.

8. The apparatus according to claim 7, wherein the length of the voice input to be recognized is associated with the weight assigned to the addition data.

9. The apparatus according to claim 1, wherein only comparison data used to recognize a voice input of operation commands are assigned the addition data.

10. The apparatus according to claim 9, wherein comparison data other than the comparison data associated with the operation commands are removed from the comparison data selected by the speech recognition unit as recognition candidates.

11. A method for speech recognition comprising:
displaying an operation control screen on a display, the operational control screen being configured to control one or more operably connected electronic devices through a plurality of voice inputs;
calculating the matching degree for a plurality of speech recognition candidates by comparing a plurality of comparison data used to recognize voice inputs with voice input data generated based on a voice input of the plurality of voice inputs;
adding addition data to the calculated matching degree for one or more particular comparison data within the plurality of comparison data that are associated with addition data to weight the matching degree; and
recognizing the voice input based on the weighted matching degrees obtained as a result of the addition of the addition data,
wherein, when an operation control screen already configured to a particular electronic device is displayed prior to the voice input, comparison data other than the particular comparison data corresponding to the addition data associated with the operation control screen for the electronic device are removed from the comparison data selected by the speech recognition unit as recognition candidates.

12. The method according to claim 11, wherein a plurality of addition data are associated with the one or more particular comparison data.

13. A speech recognition apparatus comprising:
a control unit having a controller operably connected to one or more electronic devices, the controller being configured to display an operation control screen on a display for controlling the respective electronic devices, wherein, when the speech recognition apparatus is in a voice input configurational condition, the respective electronic devices are controlled by the controller through voice input;
a speech recognition dictionary including comparison data for use in recognition of a voice input;
a speech recognition unit adapted to calculate a matching degree by comparing voice input data generated based on the voice input with the comparison data, recognize the voice input based on the matching degree, and produce the recognition result of the voice input;
and one or more addition data which are associated with one or more particular comparison data, wherein the one or more addition data is added to the matching degree of the particular comparison data thereby weighting the matching degree, and wherein the speech recognition unit produces the recognition result of the voice input based on the weighted matching degree for the particular comparison data,
wherein, when the matching degree of first comparison data calculated for a voice input and the matching degree of second comparison data calculated for the same voice input both satisfy a predetermined matching condition, if the first comparison data is associated with the operational control screen already configured to a particular electronic device before the voice input is accepted, the addition data associated with the first comparison data is assigned a greater weight than the addition data associated with the second comparison data.

14. The apparatus according to claim 13, wherein the speech recognition unit selects one or more comparison data as candidates for the recognition result for the voice input based on the matching degree calculated for each comparison data; adds the addition data associated with the one or more particular comparison data to the respective matching degrees calculated for the particular one or more comparison data; and recognizes the voice input based on weighted matching degrees obtained as a result of the addition of the addition data.

15. The apparatus according to claim 13, wherein a plurality of addition data are associated with each of the one or more particular comparison data.

16. The apparatus of claim 13, wherein the control unit comprises a navigation apparatus.

17. The apparatus of claim 13, wherein, when an operation control screen associated with a particular electronic device is displayed, comparison data other than the particular comparison data corresponding to the addition data associated with the operation control screen for the electronic device are removed from the comparison data selected by the speech recognition unit as recognition candidates.

18. The apparatus according to claim 13, wherein the weight of the addition data varies depending on the comparison data to which the addition data is associated.

19. The apparatus according to claim 13, wherein the shorter the voice input to be recognized using the comparison data, the greater the weight assigned to the addition data.

20. The apparatus according to claim 13, wherein only comparison data used to recognize a voice input of an operation command is assigned the addition data, and wherein comparison data other than the comparison data associated with operation commands are removed from the comparison data selected by the speech recognition unit as recognition candidates.

* * * * *